United States Patent
Reichle

(10) Patent No.: US 9,952,838 B2
(45) Date of Patent: Apr. 24, 2018

(54) METHODS, SYSTEMS, AND COMPUTER READABLE MEDIA FOR GENERATING A VISUAL OVERLAY

(71) Applicant: Oracle International Corporation, Redwood Shores, CA (US)

(72) Inventor: Bill Reichle, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 273 days.

(21) Appl. No.: 14/498,339

(22) Filed: Sep. 26, 2014

(65) Prior Publication Data

US 2016/0092081 A1    Mar. 31, 2016

(51) Int. Cl.
*G06F 8/38*     (2018.01)
*G06F 9/44*     (2018.01)
*G06F 3/0481*   (2013.01)
*G06F 3/0488*   (2013.01)

(52) U.S. Cl.
CPC .............. *G06F 8/38* (2013.01); *G06F 3/0481* (2013.01); *G06F 9/4443* (2013.01); *G06F 3/04886* (2013.01); *G06F 2203/04803* (2013.01); *G06F 2203/04804* (2013.01)

(58) Field of Classification Search
CPC ....... G06F 2203/04804; G06F 3/04886; G06F 2203/04803; G06F 8/38
See application file for complete search history.

(56) References Cited

U.S. PATENT DOCUMENTS

| 2014/0215340 | A1* | 7/2014 | Shetty | G06F 3/0488 715/727 |
| 2015/0121306 | A1* | 4/2015 | Fundament | G06F 3/0482 715/811 |
| 2015/0346976 | A1* | 12/2015 | Karunamuni | G06F 3/04817 715/765 |

OTHER PUBLICATIONS

"Oracle Business Process Management Suite," Oracle Fusion Middleware: Business Process Management, Oracle Data Sheet, Oracle, pp. 1-4 (Copyright 2014).
"Oracle Projects Fundamentals," Oracle, Release 12.1, Part No. E13581-04, https://web.archive.org/web/20130917011204/http://docs.oracle.com/cd/E18727_01/doc.121/e13581/T181945T327430.htm, pp. 1-53 (Sep. 17, 2013).
"Oracle Fusion Middleware—User's Guide for Oracle Business Process Management," 11gRelease (11.1.1.6.3), E15175-11, Oracle, pp. 1-242 (Oct. 2012).

* cited by examiner

*Primary Examiner* — Sherrod Keaton
(74) *Attorney, Agent, or Firm* — Jenkins, Wilson, Taylor & Hunt, P.A.

(57) ABSTRACT

Methods, systems, and computer readable media for generating a visual overlay are disclosed. According to one exemplary method for generating a visual overlay, the method includes providing a graphical user interface (GUI) window including one or more user interface (UI) elements. The method also includes receiving user input via interaction with the UI elements. The method further includes in response to receiving the user input, generating and displaying a visual overlay in at least a portion of the GUI window, wherein the visual overlay includes at least one dynamic UI element that includes one or more characteristics determined using the user input.

18 Claims, 4 Drawing Sheets

| UI ELEMENT IDs | DYNAMIC CHARACTERISTIC(S) | USER INPUT / FACTORS | RELEVANCE RATING |
|---|---|---|---|
| A1 | VISIBLE=TRUE, DESTINATION="F1" | PREVIOUS USER SELECTED FRAME (F1) | 100 |
| A2 | VISIBLE=TRUE, DESTINATION="F3" | PREVIOUS USER SELECTED FRAME (F1) AND CURRENT USER SELECTED FRAME (F2) | 100 |
| A3 | VISIBLE=FALSE, DESTINATION="F4", COLOR="BLUE", FRAME_LOCATION= "BELOW UI ELEMENT 'Y1'" | HAS UI ELEMENT 'Y1' BEEN SELECTED BY USER? | 12 |
| B1 | VISIBLE=FALSE, DIMENSIONS="200 x 200 PIXELS", OPACITY=.50 | HAS ENOUGH DATA BEEN GATHERED OR DERIVED? | 10 |
| B2 | VISIBLE=FALSE, DIMENSIONS="150 x 150 PIXELS", OPACITY=0.25 | HAS USER RESIZED GRAPHIC(S) IN PREVIOUS FRAME(S)? | 0 |
| C1 | VISIBLE=FALSE, EDITABLE=FALSE | HAS DATA ENTRY FOR 'F4' BEEN COMPLETED? | 0 |
| D1 | VISIBLE=FALSE, VOLUME=0%, AUTOPLAY=FALSE | HAS USER STOPPED OR STARTED SIMILAR UI ELEMENTS RECENTLY? | 0 |

FIG. 3

METHODS, SYSTEMS, AND COMPUTER READABLE MEDIA FOR GENERATING A VISUAL OVERLAY

TECHNICAL FIELD

The subject matter described herein relates to generating graphical user interfaces. More specifically, the subject matter relates to methods, systems, and computer readable media for generating a visual overlay.

BACKGROUND

The need to minimize the amount of time taken by a user of a computer application to complete a given transaction has been an ongoing problem for organizations everywhere. Quicker completion of transactions means lowers expenses for an enterprise since a user can accomplish more operations per unit of time, which indicates increased productivity and/or efficiency.

A transaction may be defined as a series of discrete tasks. Using this definition, the time taken to complete a transaction may include the total amount of time taken by the user to complete all individual tasks plus transition times between each of the tasks. A transition time may be measured as the time between two subsequent tasks. For example, a transition time may include a graphical user interface (GUI) element (e.g., UI window) refresh and/or user-related delays (e.g., mental preparation, selecting an appropriate next option, etc.).

Current approaches for improving computing-related transaction efficiency generally focus on reducing the time taken for individual task, while largely ignoring the issue of transition times. Hence, such approaches do little to induce the user to recall the objectives of the next task and/or to optimize the application for transition between tasks.

Accordingly, a need exists for improved methods, systems, and computer readable media for generating a visual overlay.

SUMMARY

Methods, systems, and computer readable media for generating a visual overlay are disclosed. According to one exemplary method for generating a visual overlay, the method includes providing a graphical user interface (GUI) window including one or more user interface (UI) elements. The method also includes receiving user input via interaction with the UI elements. The method further includes in response to receiving the user input, generating and displaying a visual overlay in at least a portion of the GUI window, wherein the visual overlay includes at least one dynamic UI element that includes one or more characteristics determined using the user input.

According to one exemplary system, the system includes at least one processor and a memory. The system also includes an overlay generation module (OGM) implemented using the at least one processor and the memory. The OGM is configured to provide a GUI window including one or more UI elements, to receive user input via interaction with the UI elements, and in response to receiving the user input, to generate and display a visual overlay in at least a portion of the GUI window, wherein the visual overlay includes at least one dynamic UI element that includes one or more characteristics determined using the user input.

The subject matter described herein may be implemented in software in combination with hardware and/or firmware. For example, the subject matter described herein may be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to hardware, firmware, or software in combination with hardware and/or firmware for implementing features described herein.

BRIEF DESCRIPTION OF THE DRAWINGS

The subject matter described herein will now be explained with reference to the accompanying drawings of which:

FIG. 3 is a diagram illustrating exemplary data usable for determining characteristics associated with dynamic UI elements according to an embodiment of the subject matter described herein.

DETAILED DESCRIPTION

Figure 1:
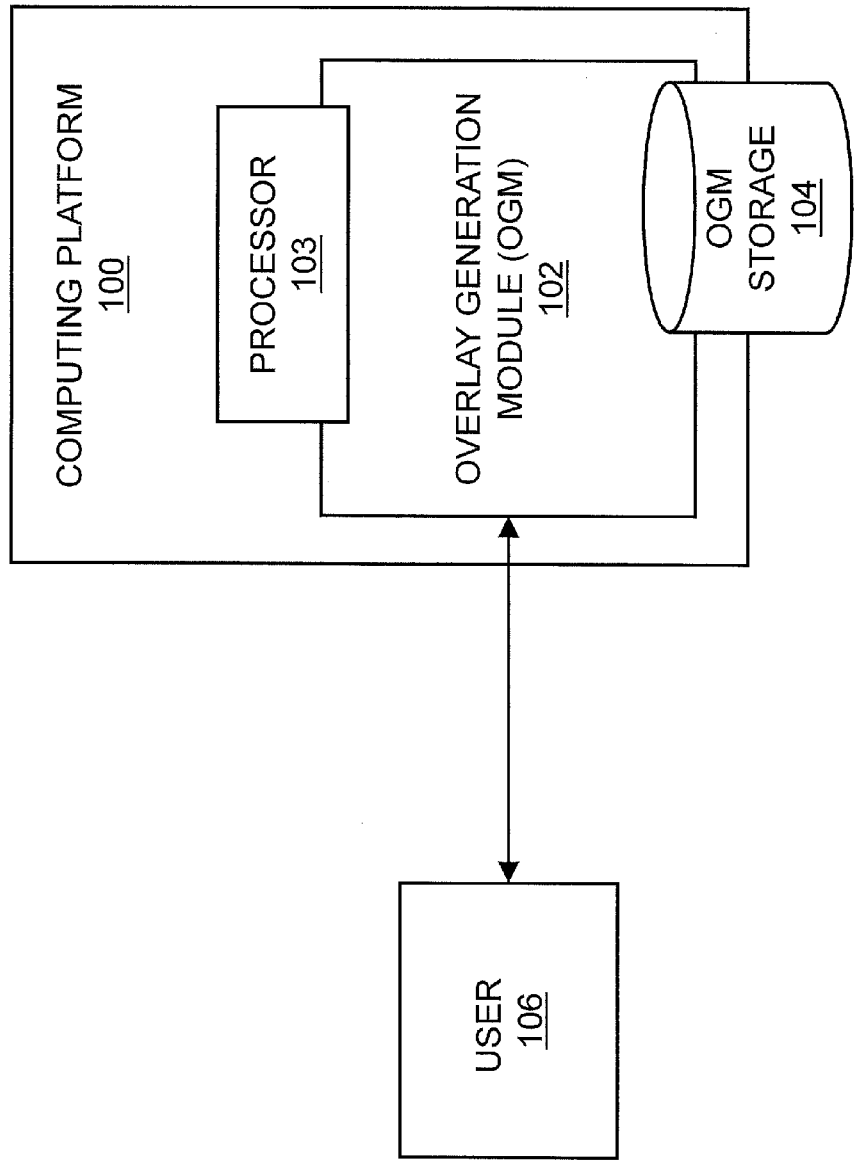
FIG. 1 is a diagram illustrating an exemplary computing platform according to an embodiment of the subject matter described herein.

The subject matter described herein includes methods, systems, and computer readable media for generating a visual overlay. Generally, an enterprise application or other task-based application may support hundreds of tasks (e.g., subtasks, transactions, actions, or steps, such as data entry, associated with performing a task or action). If a single user interface (UI) window (e.g., a graphical user interface (GUI) window) is generated for performing a single task, hundreds of UI windows may be necessary to perform hundreds of tasks within a business application. The sheer quantity of potential UI windows utilized in a task-based application triggers UI designers to hide most UI windows behind various UI elements, such as menu options, nested menu options, tabs, and/or toolbars. While menus may be utilized to hide UI windows and de-clutter applications, such UI layouts inhibit the navigation between UI windows because the user is overwhelmed with choices. Moreover, using UI elements to hide UI windows hinders a user from preparing for (e.g., recollecting) a next task. Exacerbating user preparedness issues are applications that generate UI windows that, when activated, occupy the entire available visual area or display space for the applications, thereby depriving a user a sense of context, e.g., with regard to other tasks and/or windows available. Moreover, many applications remain on the most recent UI window upon completion of a task with no sensory cues as to what should be the next task. Accordingly, current UI layouts typically prolong transition times between tasks since such UI layouts provide little or no assistance for triggering a user to recollect or prepare for a next task.

In accordance with some aspects of the subject matter described herein, a computing platform (e.g., a device or a node) or a module (e.g., a field-programmable gateway array (FPGA), an application-specific integrated circuit (ASIC), or software executing on or embedded within a processor) may be configured to provide (e.g., generate and/or display) one or more visual overlays. For example, a visual overlay may be generated and displayed in response to selecting a hyperlink or interacting with a UI element associated with a main application UI window. In this example, the visual overlay may be displayed (e.g., a pop-up UI window and/or a semi-transparent UI window) such that at least some portion of the main application UI window remains visible. Seeing the same main application UI window during and after working with a visual overlay may serve as a reminder for users of ensuing steps, thereby by reducing mental strain and less time spent transitioning between tasks. As such, users may be able to more efficiently accomplish her business tasks because the total set of available actions competing for attention has been reduced.

In accordance with some aspects of the subject matter described herein, a computing platform or a module may be configured to consolidate functionality by providing one or more frames (e.g., a UI window) within a visual overlay. For example, a visual overlay may include a series of frames and/or UI elements that enable a user to navigate to a requisite frame all without leaving the visual overlay, thereby reducing the overall number of UI windows associated with a particular application. By using a visual overlay to combine or consolidate functionality, a significant number of application functions can be accommodated with a lower number of overlays and a drastically reduced number of menus, toolbars, and/or tabs.

In accordance with some aspects of the subject matter described herein, a computing platform or a module may be configured to consolidate functionality by generating a visual overlay including one or more dynamic UI elements. For example, a dynamic UI element may include a hyperlink, text, a graphic, a multimedia element (e.g., a video and/or audio element), and/or an icon for loading and/or providing information. Dynamic UI elements may include characteristics and/or attributes that can be dynamically generated, removed, or modified based on one or more factors, such as user input, relevance information, priority information, historical information (e.g., past user actions), and/or preconfigured information (e.g., factory settings or stored templates). For example, a frame location associated with a dynamic UI element may be governed by user expectations rather than being at a fixed location, e.g., in juxtapose to a menus, toolbars and tabs based approach. In another example, a dynamic UI element may be generated or displayed only if relevant for a given context, e.g., relevant for currently rendered or displayed information within the visual overlay. Hence, in this example, dynamic UI elements (e.g., hyperlinks) determined to be irrelevant in the context may not even be rendered.

Advantageously, some aspects of the present subject matter provide a visual overlay that can reduce transition times between tasks associated with task-based (e.g., transactional) applications. For example, an exemplary visual overlay may minimize one or more factors that contribute to excessive task transition times, e.g., such that the time taken to transition an application and/or user to a state necessary for executing ensuing task is lowered. In this example, the visual overlay may minimize such factors by making the user aware of all supported and/or relevant tasks via embedded dynamic UI elements (e.g., that are relevant and/or conveniently placed based on user expectations). Hence, an exemplary visual overlay can provide reduced transition times between tasks in an application by simplifying navigation and maintaining context for subsequent and/or previous tasks, thereby allowing users to complete transactions (e.g., one or more tasks) more quickly.

Reference will now be made in detail to exemplary embodiments of the subject matter described herein, examples of which are illustrated in the accompanying drawings. Wherever possible, the same reference numbers will be used throughout the drawings to refer to the same or like parts.

FIG. 1 is a diagram illustrating an exemplary computing platform 100 for generating a visual overlay according to an embodiment of the subject matter described herein. Computing platform 100 may represent any suitable entity or entities (e.g., a business transaction platform or a stand-alone tool, or a specialized device) for generating a visual overlay. For example, computing platform 100 may include a computing system for performing one or more task-based applications. In this example, computing platform 100 may be configured to display one or more user interfaces for providing information associated with the applications, to receive user input (e.g., user interaction), and/or to generate and/or display one or more visual overlays.

Computing platform 100 may include an overlay generation module (OGM) 102. OGM 102 may be any suitable entity (e.g., software executing on processor 103) for performing one or more aspects associated with generating, providing, and/or displaying one or more visual overlays. OGM 102 may include functionality for generating and/or displaying a visual overlay including one or more frames, hyperlinks, and/or other UI elements. For example, OGM 102 may receive user input (e.g., a selected hyperlink) associated with a main application UI window. In this example, OGM 102 may generate a visual overlay for performing one or more tasks (e.g., subtasks) and may include content (e.g., UI elements) based on or using the user input.

In some embodiments, OGM 102 may include functionality for interacting with one or more task-based applications. For example, OGM 102 may interact with a task-based application that provides input from a user and receives output (e.g., a visual overlay) from OGM 102. In another example, a task-based application and OGM 102 may be integrated. For example, a task-based application may include OGM 102 and/or related functionality.

In some embodiments, OGM 102 may include or access OGM storage 104 containing information related to visual overlay generation. For example, OGM 102 may access OGM storage 104 containing task information, UI elements, preconfigured information, settings, configurations, and/or historical information (e.g., user preferences). Exemplary data storage in OGM storage 104 may include non-transitory computer readable media, such as flash memory, random access memory, or other storage devices. In some embodiments, OGM storage 104 may be external to and/or or integrated with computer platform 100 and/or OGM 102.

In some embodiments, OGM 102 may include functionality for generating one or more frames (e.g., UI element containers) in a visual overlay. For example, OGM 102 may determine a number of tasks (e.g., subtasks) that require user input. In this example, OGM 102 may arrange or group one or more related tasks into one or more frames. Continuing with this example, OGM 102 may include UI elements (e.g., hyperlinks) to move or traverse through the one or more frames.

In some embodiments, OGM 102 may include functionality for generating one or more dynamic UI elements (e.g., UI elements that include dynamic characteristics) associated with a visual overlay. For example, OGM 102 may generate a visual overlay containing one or more text boxes for providing input about a given task. In this example, the one or more text boxes may be located above or below a related graphic (e.g., in the visual overlay or a visible or semi-visible underlying UI window) such that a user can determine appropriate input using the graphic. In another example, OGM 102 may generate a visual overlay containing only relevant UI elements based on a current task or a future task to be performed. In this example, UI elements (e.g., text boxes, check boxes, and/or hyperlinks) may not be displayed in the visual display for tasks that are deemed irrelevant, e.g., by OGM 102 or OGM user 106. In yet another example, dynamic hyperlinks may change destinations (e.g., tasks or related information to be displayed) based on user input, user expectations, and/or factors.

In some embodiments, OGM 102 may generate a visual overlay containing one or more dynamic UI elements (e.g., icons, text, and/or hyperlinks) for navigating between frames or related tasks. In some embodiments, a dynamic UI element may include characteristics (e.g., size, opacity, location, type, etc.) dynamically determined (e.g., not predetermined or preconfigured) based on user input, such as user selections, text inputted, and/or other interactions. For example, a first hyperlink may be associated with a frame considered to be a previous task to a currently displayed task and, as such, may be displayed as a left arrow on the left side of the visual display. Continuing with this example, a second hyperlink may be associated with a frame considered to be a subsequent task to a currently displayed task and, as such, may be displayed as a right arrow on the right side of the visual display.

In some embodiments, a visual overlay may provide user-related context and/or task-related context. For example, OGM 102 may generate a visual overlay that includes at least one semi-transparent or transparent portion (e.g., a semi-transparent background), thereby allowing a user to see a portion of a main application UI window or other UI window. In another example, OGM 102 may generate a visual overlay that is smaller than a main application UI window, thereby allowing a user to see the main application UI window wherever the visual overlay is not displayed. By displaying a visual overlay and another UI window at the same time, a user may be provided with additional context (e.g., information not currently displayed in the visual overlay) which may increase efficiency associated with transitioning to another task, e.g., a task not currently displayed in the visual overlay.

In some embodiments, OGM 102 may include one or more communications interfaces for interacting with users and/or nodes. For example, OGM 102 may provide a communications interface for communicating with OGM user 106. In some embodiments, OGM user 106 may be an automated system or an application (e.g., an enterprise application or portion thereof). In some embodiments, OGM user 106 may be controlled or controllable by a human user. OGM user 106 may interact with OGM 102 and/or related applications, e.g., via UI windows and/or visual overlays.

It will be appreciated that FIG. 1 is for illustrative purposes and that various nodes and/or modules, locations, and/or functionality described above in relation to FIG. 1 may be changed, added, or removed. For example, OGM 102 may be distributed across multiple computing platforms or devices and may be incorporated into an application module or other entity.

Figure 2:
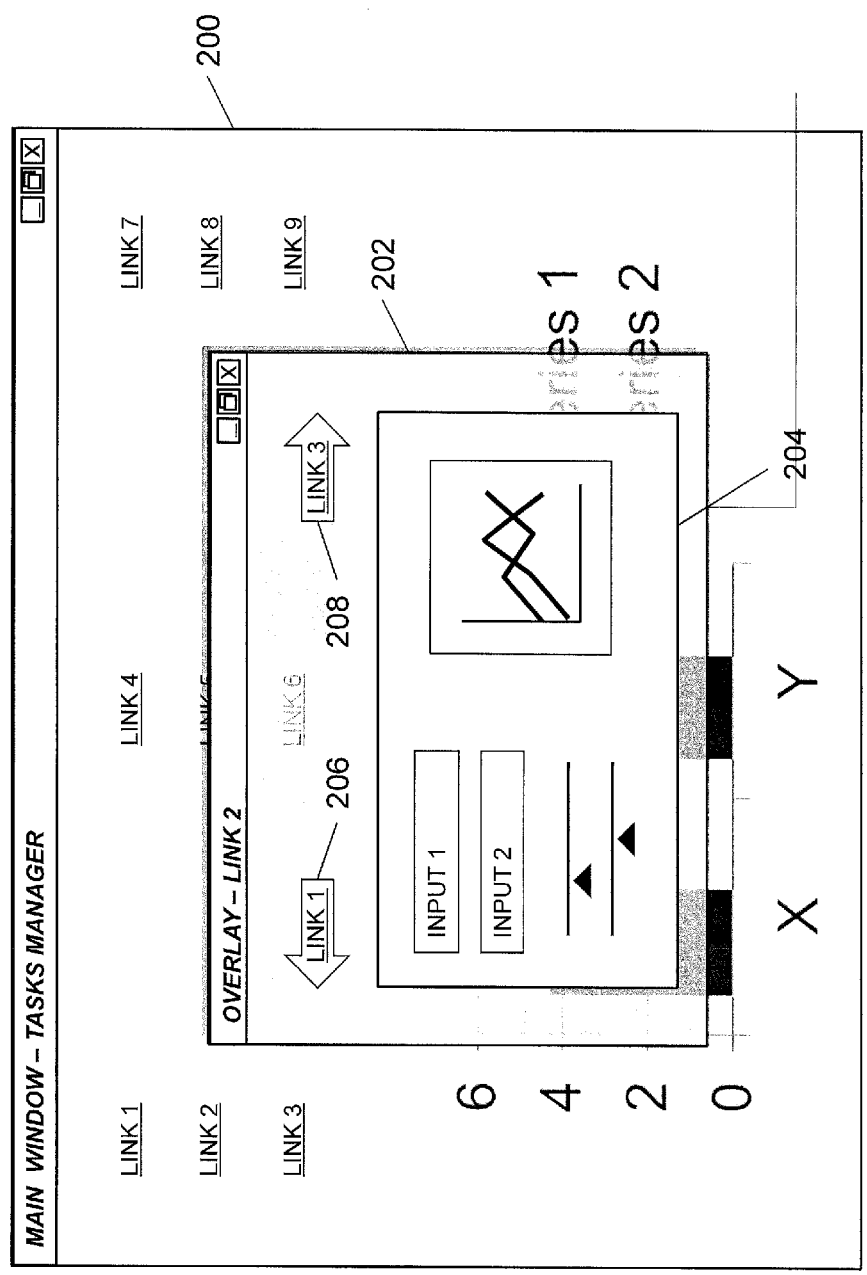
FIG. 2 is a diagram illustrating an exemplary graphical user interface (GUI) for utilizing a visual overlay according to an embodiment of the subject matter described herein.

FIG. 2 is a diagram illustrating an exemplary GUI window 200 according to an embodiment of the subject matter described herein. GUI window 200 may represent any suitable UI element container or UI window for displaying or providing UI elements, UI element containers, and/or information to a user. In some embodiments, OGM 102 and/or an associated module or node may generate, display, or provide GUI window 200 and/or a visual overlay 202 for providing information. In some embodiments, OGM 102 may be located in or integrated with an application for performing one or more tasks, e.g., transactions and/or subtasks associated with a business.

Referring to FIG. 2, GUI window 200 may include UI elements (e.g., hyperlinks) for selecting one or more tasks. In some embodiments, GUI window 200 may include UI elements for selecting settings and/or options associated with one or more tasks. For example, a 'LINK 1' hyperlink may represent a UI element that generates and/or displays information associated with a first task when selected or activated by a user. In another example, a 'LINK 2' hyperlink may represent a UI element that generates and/or displays information associated with a second task when selected or activated by a user.

In some embodiments, activating a UI element in GUI window 200 may trigger visual overlay 202 to be generated and/or displayed. Visual overlay 202 may represent any suitable UI element container or UI window for displaying or providing UI elements, UI element containers, and/or information to a user. For example, visual overlay 202 may provide UI elements (e.g., a text input box, an option box, and/or a drop down menu box) for allowing a user to input information and/or for performing other steps associated with a task.

In some embodiments, visual overlay 202 may be configured to allow a user to maintain a sense of awareness or context while interacting with one or more UI elements associated with visual overlay 202. In such embodiments, visual overlay 202 may be configured to allow other UI windows or portions of other UI windows to be visible. For example, visual overlay 202 may include transparent or semi-transparent portions such that an underlying UI window (e.g., GUI window 200) can be visible to the user. In another example, visual overlay 202 may be smaller (e.g., in visual area) than GUI window 200, thereby allowing a user to see at least a portion of GUI window 200, e.g., in areas where visual overlay 202 is not depicted.

In some embodiments, visual overlay 202 may be configured to display additional tasks or other information after a user indicates completion of a current task. For example, after a task is complete and the task is dismissed, a user may be presented or provided with a subsequent task, e.g., via a frame in visual overlay 202. In this example, the subsequent task may be determined using one or more factors, e.g., relevance information, priority information, user input, user expectations, preconfigured information, historical information, or user preferences.

In some embodiments, by displaying visual overlay 202 along with content from another UI window (e.g., GUI window 200), a user may be provided with additional context or awareness which may increase efficiency associated with transitioning to another task, e.g., a task not currently displayed in visual overlay 202. In such embodiments, the additional context or awareness may act as a constant reminder to the user of task-related progress, e.g., where the user is now and where the user needs to be next. For example, seeing GUI window 200 during and after working with visual overlay 202 may remind a user of ensuing steps or tasks, thereby improving user productivity by reducing time spent transitioning from one task to another task. In contrast, prior approaches generally fail to provide additional context and can hinder user awareness by providing UI windows that occupy an application's entire UI area and/or by leaving UI windows visible even after a task is completed.

In some embodiments, combining tasks into visual overlay 202 may reduce the total number of overlays in an application, e.g., thereby accommodating a significant number of tasks (e.g., data entry) with less visual overlays. In some embodiments, visual overlay 202 may present tasks and/or UI elements that are relevant in a given context. By combining related functionality and by using presentation intelligence to present relevant tasks to a user, navigation and transitions between tasks are simplified, thereby resulting in increased user productivity (e.g., quicker business transaction completion times).

As depicted in FIG. 2, visual overlay 202 may include a frame 204 and navigation-related UI elements 206-208. Frame 204 may represent a UI window and may include UI elements and/or other information associated with a task. In some embodiments, frame 204 may provide information and/or UI elements associated with a currently displayed task. For example, frame 204 may include multiple UI elements, such as text input boxes and UI sliders, for inputting data associated with a graphic or chart. In this example, frame 204 may change or update the graphic or chart dynamically based on user input and/or other factors.

Navigation-related UI elements 206-208 may represent any suitable UI elements for navigating between frames or UI windows associated with visual overlay 202. For example, navigation-related UI element 206 may include an arrow icon and may be associated with a previous task in relation to a currently displayed task and, as such, when selected (e.g., clicked) or activated by a user may cause or trigger the associated task (or a related frame) to be displayed in visual overlay 202. Continuing with this example, navigation-related UI element 208 may include an arrow icon and may be associated with a subsequent task in relation to the currently displayed task and, as such, when selected or activated by the user may cause or trigger the associated task (or a related frame) to be displayed in visual overlay 202.

In some embodiments, visual overlay 202 or frame 204 may include dynamic UI elements. In some embodiments, a dynamic UI element and/or characteristics thereof may be generated, modified, removed, or included in visual overlay 202 and/or frame 204 based on one or more factors, e.g., relevance information, priority information, user input, user expectations, preconfigured information, historical information, or user preferences. For example, user input may include selecting an option box or entering information in a text input box. In this example, OGM 102 may be configured to generate and display a dynamic UI element, such as an additional text input box, in visual overlay 202 in response to the user input. In another example, user input may include de-selecting an option box or deleting information in a text input box. In this example, OGM 102 may be configured to remove a dynamic UI element from visual overlay 202 in response to the user input.

In some embodiments, navigation-related UI elements 206-208 may be dynamic UI elements and may include characteristics dynamically set using one or more factors, e.g., relevance information, priority information, user input, user expectations, preconfigured information, historical information, or user preferences (e.g., left-handedness or right-handedness). In this example, user input (e.g., user selections performed in frame 204 and/or a previous frame) may affect or determine which frame or related task is associated with each of navigation-related UI elements 206-208.

In some embodiments, one or more characteristics associated with a dynamic UI element may be modified, generated, removed, or affected based on one or more factors, e.g., relevance information, priority information, user input, user expectations, preconfigured information, historical information, or user preferences. For example, locations of hyperlinks displayed in visual overlay 202 may be determined by user expectations. In contrast, conventional UI elements, like menus, toolbars, and tab based approaches generally depict UI elements in fixed locations regardless of user expectations. In another example, hyperlinks determined to be irrelevant may not even displayed or rendered, e.g., a visibility or transparency attribute associated with a dynamic UI element may be set to 'FALSE' based on the dynamic UI element's determined relevancy. In yet another example, UI elements that are determined to be less relevant may be smaller in display dimensions or otherwise less noticeable to a user than UI elements that are determined to be more relevant.

In some embodiments, determining whether a UI element is relevant may include analyzing a current context (e.g., data currently displayed or presented to a user), a prior context (e.g., data associated with a previous task or frame), user expectations (e.g., previous UI elements presented), historical information (e.g., previous tasks completed and/or options selected), user input, preconfigured information, user preferences, and/or other information. For example, if frame 204 and/or visual overlay 202 are associated with generating an inventory report for a widget 'C', OGM 102 may determine that UI elements associated with a widget 'B' are not relevant and, as such, may not display these UI elements in frame 204 and/or visual overlay 202. In another example, prior to determining that a user wants to generate an inventory report for a widget 'C', OGM 102 may determine that UI elements associated with widget 'B' and other widgets are relevant and, as such, may display these UI elements in frame 204 and/or visual overlay 202. In this example, frame 204 and/or visual overlay 202 may dynamically display these UI elements until or unless user input indicates that such UI elements are no longer relevant.

It will be appreciated that FIG. 2 is for illustrative purposes and that various UI elements described above in relation to FIG. 2 may be changed, added, or removed. It will also be appreciated that user input may be submitted using various techniques. For example, user input and associated information may be provided via an API and/or command line interface.

FIG. 3 is a diagram illustrating exemplary data 300 usable for determining characteristics associated with dynamic UI elements according to an embodiment of the subject matter described herein. Data 300 may include any suitable information, such as relevance information, priority information, historical information, user expectations, or preconfigured information, for determining characteristics associated with dynamic UI elements. In some embodiments, data 300 may be obtained or derived from user input and/or other sources. In some embodiments, data 300 may be accessed by computing platform 100, OGM 102, and/or another entity and may be stored using various data structures (e.g., in OGM storage 104).

In some embodiments, OGM 102 may be configured to access and utilize data 300 for determining whether a dynamical UI element is displayed in visual overlay 202 and/or frame 204. In some embodiments, OGM 102 may be configured to access and utilize data 300 for determining characteristics (e.g., attributes) associated with dynamic UI elements. For example, prior to and/or while displaying visual overlay 202, OGM 102 may inspect data 300 for selecting relevant UI elements to display and for setting one or more characteristics associated with the UI elements.

Referring to FIG. 3, data 300 may be depicted using a table representing associations between UI elements identifiers (IDs), dynamic characteristic(s), user input and/or other factors, and relevance ratings. Each UI element ID in data 300 may identify or represent a UI element that may be displayed or included in visual overlay 202 and/or frame 204. In this example, each UI element ID may be represented by an alphanumerical value, such as 'A1', 'A2', 'A3', 'C1', or 'D1', where each letter may identify a particular UI element type. Exemplary UI element types may include a hyperlink, text, a graphic, a multimedia element, a video element, an audio element, and/or an icon.

Dynamic characteristics in data 300 may represent any characteristics associated with a UI element that can be changed, added, and/or deleted and may be determined using (e.g., based on) user input and/or other factors, such as relevance information, priority information, historical information, user expectations, and/or preconfigured information. Exemplary dynamic characteristics associated with UI elements may include visibility, a size (e.g., display dimensions), a shape, a color, an opacity (e.g., a transparency attribute), a link destination, a UI element type, or a location (e.g., in visual overlay 202 and/or frame 204), an editable attribute, an auto-play attribute, and/or a volume attribute.

User input and/or factors in data 300 may represent any information obtained and/or derived from user input or other sources usable for determining one or more characteristics associated with a UI element. Exemplary user input and/or factors may include a previously selected frame and/or UI element, a currently selected frame and/or UI element, determining whether data entry for a given task, frame, and/or UI element has been started, deleted, or completed, determining whether a user has interacted with a UI element, visual overlay 202 and/or frame 204, and/or other factors.

In some embodiments, user input and/or factors may be used in determining a link destination associated with a UI element. For example, as depicted in FIG. 3, a UI element represented by UI element ID 'A1' may include a hyperlink for displaying a previous frame 'F1'. In this example, the UI element may be associated with a destination attribute that may be dynamically set depending on a preceding frame selected by the user. In another example, as depicted in FIG. 3, a UI element represented by UI element ID 'A3' may be a hyperlink for displaying a subsequent frame 'F3'. In this example, the UI element may be associated with a destination attribute that may be dynamically set depending on the preceding frame 'F1' selected by the user and a current frame 'F3' selected by the user.

In some embodiments, user input and/or factors may be used in determining a location associated with a UI element. For example, as depicted in FIG. 3, a UI element represented by UI element ID 'A3' may include a hyperlink for displaying an optional frame 'F4'. In this example, the UI element may be associated with a location attribute that may be dynamically set depending on whether and/or which UI elements (e.g., options) are selected. Continuing with this example, if a UI element 'Y1' is selected, the hyperlink may be displayed beneath or below the UI element 'Y1', thereby emphasizing the relationship between the hyperlink and the triggering UI element 'Y1'.

In some embodiments, user input and/or factors may be used in determining a size, a color, and/or an opacity associated with a UI element. For example, as depicted in FIG. 3, a UI element represented by UI element ID 'B2' may include a graphic. In this example, the UI element may be associated with a dimensions attribute, an opacity attribute, and a color attribute that may be dynamically set depending on previous related user interactions, e.g., the graphic may be set to a user-expected or historically acceptable size determined based on previous resizing of other graphics. Continuing with this example, if a user has positively interacted with previous graphics, the dimensions attribute, the opacity attribute, and the color attribute may be set to enhance focus or attention on the UI element, whereas if the user has negatively interacted with previous graphics, the dimensions attribute, the opacity attribute, and the color attribute may be set to reduce focus or attention on the UI element.

In some embodiments, user input and/or factors may be used in determining a visibility attribute and/or an editable attribute associated with a UI element. For example, as depicted in FIG. 3, a UI element represented by UI element ID 'C1' may include a chart for displaying various data. In this example, the UI element may be associated with a visibility attribute and an editable attribute that may be dynamically set depending on whether data entry is completed for an associated frame 'F4'. Continuing with this example, if data entry for frame 'F4' is completed, the chart may be visible and may be editable, whereas if data entry for frame 'F4' is not completed, the chart may not be visible and/or editable.

In some embodiments, user input and/or factors may be used in determining an auto-play attribute and/or a volume attribute associated with a UI element. For example, as depicted in FIG. 3, a UI element represented by UI element ID 'D1' may include a video. In this example, the UI element may be associated with an auto-play attribute and a volume attribute that may be dynamically set depending on previous related user interactions, e.g., whether a user muted or increased the volume of a previous video. Continuing with this example, if a user has positively interacted with previous videos, the auto-play attribute and the volume attribute may be set to start playing the video at a user-expected or historically acceptable volume, whereas if the user has negatively interacted with previous videos, the auto-play attribute and the volume attribute may be set such that the video does not play automatically and/or is muted.

Relevance ratings in data 300 may represent indicators for indicating estimated relevance of UI elements. For example, a relevance rating may be represented as a score or value between '0'-'100', where '0' indicates no relevance and '100' indicates significant relevance. In this example, OGM 102 may be configured to analyze relevance ratings for determining whether a UI element is to be displayed. In some embodiments, OGM 102 may be configured to display UI elements having relevance ratings that meet or exceed a threshold (e.g., a relevance rating of 50 or above).

In some embodiments, a relevance rating may be used in determining one or more characteristics associated with a UI element. For example, as depicted in FIG. 3, a UI element represented by UI element ID 'A3' may include a visibility attribute that indicates whether the UI element is displayed in visual overlay 202. In this example, if a relevance rating associated with the UI element does not meet a threshold, the visibility attribute may be set to 'FALSE', and, as such, OGM 102 may not display the U element. In another example, as depicted in FIG. 3, a UI element represented by UI element ID 'A1' may include a visibility attribute that indicates whether the UI element is displayed in visual overlay 202. In this example, if a relevance rating associated with the UI element meets a threshold, the visibility attribute may be set to 'TRUE', and, as such, OGM 102 may display the UI element.

In some embodiments, a relevance rating may be determined using user input and/or other factors. For example, as depicted in FIG. 3, a UI element represented by UI element ID 'A3' may include a hyperlink for displaying a frame 'F4' for performing additional data entry in response to a user selecting an UI element 'Y1' in frame 204. In this example, a relevance rating may be low for UI element ID 'A3' while the UI element 'Y1' remains unselected, but may increase significantly (e.g., to '100') if the UI element 'Y1' is selected.

In another example, as depicted in FIG. 3, a UI element represented by UI element ID 'B1' may include a graphic for depicting data entered by user and/or derived elsewhere. In this example, a relevance rating may be based on an amount of relevant data entered, obtained, or derived. Continuing with this example, a relevance rating may increase as the amount of data needed to accurately generate the UI element is entered, obtained, or derived.

In yet another example, as depicted in FIG. 3, a UI element represented by UI element ID 'D1' may include a video. In this example, a relevance rating may be based on user preferences, historical information, and/or user expectations. Continuing with this example, a relevance rating for a subsequent video may be lowed if a user habitually stops videos within the first few seconds of the videos being played in frame 204. Similarly, a relevance rating for a subsequent video may be increased if a user habitually starts or replays videos associated with frame 204.

It will be appreciated that data 300 in FIG. 3 is for illustrative purposes and that different and/or additional information may also be obtained and/or derived for generating visual overlay and/or related content.

Figure 4:
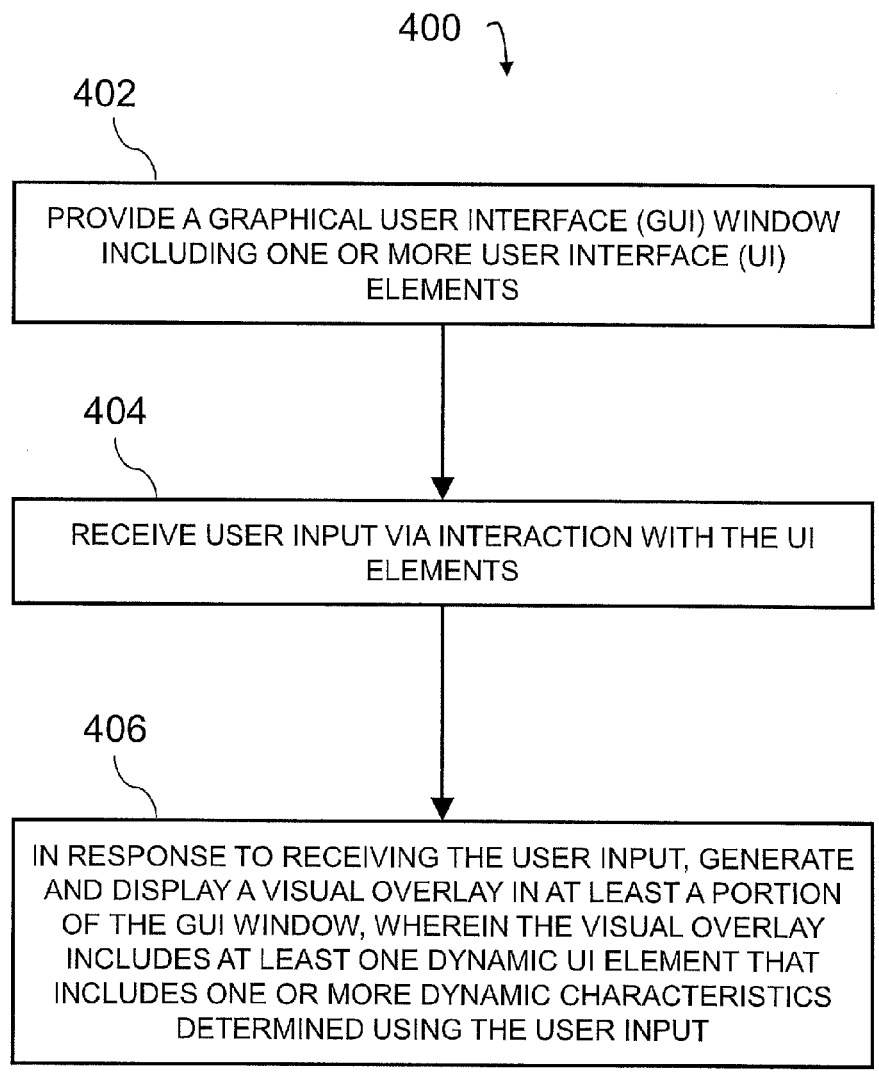
FIG. 4 is a diagram illustrating an exemplary process for generating a visual overlay according to an embodiment of the subject matter described herein.

FIG. 4 is a diagram illustrating an exemplary process 400 for generating visual overlay 202 according to an embodiment of the subject matter described herein. In some embodiments, exemplary process 400, or portions thereof, may be performed by or at computing platform 100, OGM 102, and/or another node or module. In some embodiments, exemplary process 400 may include steps 402, 404, and/or 406.

Referring to exemplary process 400, at step 402, GUI window 200 including one or more UI elements may be provided.

In some embodiments, GUI window 200 or visual overlay 202 may include dynamic data determined to be relevant to a user. For example, GUI window 200 may display tasks via hyperlinks or other UI elements in a main application UI window.

In some embodiments, at least some of GUI window 200 may remain visible while visual overlay 202 is displayed. For example, visual overlay 202 may be displayed over a portion of GUI window 200.

At step 404, user input may be received via interaction with the UI elements.

At step 406, in response to receiving the user input, visual overlay 202 may be generated and displayed in at least a portion of GUI window 200. In some embodiments, visual overlay 202 may include at least one dynamic UI element that includes one or more characteristics based on the user input.

In some embodiments, visual overlay 202 may include a semi-transparent portion or a transparent portion.

In some embodiments, visual overlay 202 may include one or more frames for performing one or more tasks.

In some embodiments, visual overlay 202 may include navigation-related UI elements for navigating between the one or more frames.

In some embodiments, visual overlay 202 may remain visible when moving between the one or more frames.

In some embodiments, at least one dynamic UI element may include a hyperlink, text, a graphic, a multimedia element, a video element, an audio element, and/or an icon.

In some embodiments, one or more characteristics (e.g., a size, a shape, an opacity, a link destination, a UI element type, a location in visual overlay 202, an auto-play attribute, a visibility attribute, a color attribute, or a volume attribute) associated with at least one dynamic UI element may be determined using relevance information, priority information, historical information, user expectations, or preconfigured information. For example, OGM 102 may generate dynamic UI elements for visual overlay 102 that include dynamic characteristics that can change based on user input. In this example, the dynamic UI elements may be "greyed out" or inactive until user input indicates that the UI elements may be relevant. In another example, OGM 102 may generate dynamic UI elements that include hyperlinks having destination attributes that change based on user input, user expectations, and/or other information.

It should be noted that computing platform 100, OGM 102, and/or functionality described herein may constitute a special purpose computing device. Further, computing platform 100, OGM 102, and/or functionality described herein can improve the technological field of performing tasks (e.g., subtasks) associated with various computer applications by utilizing visual overlay 202 to minimize transition times associated with displaying and processing information associated with the tasks.

The subject matter described herein for generating a visual overlay and related presentation intelligence (e.g., dynamic UI elements) improves the functionality of task-based applications and related nodes by providing for more efficient UI layouts that improve user experience and productivity. It should also be noted that a computing platform that implements the subject matter described herein may comprise a special purpose computing device usable to generate a visual overlay for one or more computer applications.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for generating a visual overlay, the method comprising:
   displaying a graphical user interface (GUI) window in a task-based application including one or more user interface (UI) elements;
   receiving user input via interaction with the UI elements; and in response to receiving the user input, generating and displaying a visual overlay in at least a portion of the GUI window, wherein the visual overlay includes one or more frames for performing one or more tasks, wherein the visual overlay includes at least one dynamic UI element that includes one or more characteristics determined using the user input, wherein the at least one dynamic UI element includes a first dynamic UI element and a second dynamic UI element, wherein the first dynamic UI element includes an opacity attribute that changes based on a relevance rating affected by previous user interactions with the first dynamic UI element and other UI elements of the same type, wherein the visual overlay includes a second dynamic element that includes a hyperlink, wherein a link destination of the hyperlink changes from a first destination to a second destination when the relevance rating associated with the first dynamic UI element meets or exceeds a threshold value.

2. The method of claim 1 wherein the GUI window or the visual overlay includes dynamic data determined to be relevant to a user.

3. The method of claim 1 wherein at least some of the GUI window remains visible while the visual overlay is displayed.

4. The method of claim 1 wherein the visual overlay includes a semi-transparent portion or a transparent portion.

5. The method of claim 1 wherein the visual overlay include navigation-related UI elements for navigating between the one or more frames.

6. The method of claim 5 wherein the visual overlay remains visible when moving between the one or more frames.

7. The method of claim 1 wherein the at least one dynamic UI element includes a hyperlink, text, a graphic, a multimedia element, a video element, an audio element, or an icon.

8. The method of claim 1 wherein the one or more characteristics associated with the at least one dynamic UI element includes a size, a shape, a link destination, a UI element type, a location in the visual overlay, an auto-play attribute, a visibility attribute, a color attribute, or a volume attribute and wherein the one or more characteristics are determined using relevance information, priority information, historical information, user expectations, or preconfigured information.

9. A system for generating a visual overlay, the system comprising:
   at least one processor;
   a memory; and
   an overlay generation module (OGM) implemented using the at least one processor and the memory, wherein the OGM is configured to display a graphical user interface (GUI) window in a task-based application including one or more user interface (UI) elements, to receive user input via interaction with the UI elements, and in response to receiving the user input, to generate and display a visual overlay in at least a portion of the GUI window, wherein the visual overlay includes one or more frames for performing one or more tasks, wherein the visual overlay includes at least one dynamic UI element that includes one or more characteristics determined using the user input, wherein the at least one dynamic UI element includes a first dynamic UI element and a second dynamic UI element, wherein the first dynamic UI element includes an opacity attribute that changes based on a relevance rating affected by previous user interactions with the first dynamic UI element and other UI elements of the same type, wherein the visual overlay includes a second dynamic element that includes a hyperlink, wherein a link destination of the hyperlink changes from a first destination to a second destination when the relevance rating associated with the first dynamic UI element meets or exceeds a threshold value.

10. The system of claim 9 wherein the GUI window or the visual overlay includes dynamic data determined to be relevant to a user.

11. The system of claim 9 wherein at least some of the GUI window remains visible while the visual overlay is displayed.

12. The system of claim 9 wherein the visual overlay includes a semi-transparent portion or a transparent portion.

13. The system of claim 9 wherein the visual overlay include navigation-related UI elements for navigating between the one or more frames.

14. The system of claim 13 wherein the visual overlay remains visible when moving between the one or more frames.

15. The system of claim 9 wherein the at least one dynamic UI element includes a hyperlink, text, a graphic, a multimedia element, a video element, an audio element, or an icon.

16. The system of claim 9 wherein the one or more characteristics associated with the at least one dynamic UI element includes a size, a shape, a link destination, a UI element type, a location in the visual overlay, an auto-play attribute, a visibility attribute, a color attribute, or a volume attribute and wherein the OGM is configured to determine the one or more characteristics using relevance information, priority information, historical information, user expectations, or preconfigured information.

17. A non-transitory computer readable medium comprising computer executable instructions embodied in the computer readable medium that when executed by a processor of a computer control the computer to perform steps comprising: displaying a graphical user interface (GUI) window in a task-based application including one or more user interface (UI) elements;
   receiving user input via interaction with the UI elements; and in response to receiving the user input, generating and displaying a visual overlay in at least a portion of the GUI window, wherein the visual overlay includes one or more frames for performing one or more tasks, wherein the visual overlay includes at least one dynamic UI element that includes one or more characteristics determined using the user input, wherein the at least one dynamic UI element includes a first dynamic UI element and a second dynamic UI element, wherein the first dynamic UI element includes an opacity attribute that changes based on a relevance rating affected by previous user interactions with the first dynamic UI element and other UI elements of the same type, wherein the visual overlay includes a second dynamic element that includes a hyperlink, wherein a link destination of the hyperlink changes from a first destination to a second destination when the relevance rating associated with the first dynamic UI element meets or exceeds a threshold value.

18. The non-transitory computer readable medium of claim 17 wherein the GUI window or the visual overlay includes dynamic data determined to be relevant to a user.

* * * * *